(12) United States Patent
Kumar et al.

(10) Patent No.: US 12,530,467 B2
(45) Date of Patent: Jan. 20, 2026

(54) SYSTEMS AND METHODS FOR HANDLING SECURITY THREATS

(71) Applicant: Simbian, Inc., Mountain View, CA (US)

(72) Inventors: Ambuj Kumar, Sunnyvale, CA (US); Alankrit Chona, Redwood City, CA (US); Sumedh Barde, Sammamish, WA (US); John Chong Min Tan, Lor Limau (SG); Vishwas Pai, Bengaluru (IN); Prince Saroj, Bengaluru (IN); Hardik Maheshwari, Bengaluru (IN)

(73) Assignee: Simbian AI, Mountain View, CA (US)

( * ) Notice: Subject to any disclaimer, the term of this patent is extended or adjusted under 35 U.S.C. 154(b) by 77 days.

(21) Appl. No.: 18/583,461

(22) Filed: Feb. 21, 2024

(65) Prior Publication Data

US 2025/0265352 A1   Aug. 21, 2025

(51) Int. Cl.
*G06F 21/00* (2013.01)
*G06F 21/57* (2013.01)

(52) U.S. Cl.
CPC ................................. *G06F 21/577* (2013.01)

(58) Field of Classification Search
CPC ...................................................... G06F 21/577
See application file for complete search history.

(56) References Cited

U.S. PATENT DOCUMENTS

| | | | |
|---|---|---|---|
| 8,533,673 B2 | 9/2013 | Anlauff et al. | |
| 11,196,627 B1 * | 12/2021 | Khoo | H04L 63/102 |
| 11,416,561 B1 * | 8/2022 | Satish | H04L 63/105 |
| 2015/0269383 A1 * | 9/2015 | Lang | G06F 21/57 726/1 |
| 2018/0137401 A1 * | 5/2018 | Kumar | G06F 16/245 |
| 2020/0329070 A1 | 10/2020 | Dani et al. | |
| 2020/0389472 A1 | 12/2020 | Drapeau et al. | |
| 2021/0266341 A1 | 8/2021 | Gurtu et al. | |

(Continued)

FOREIGN PATENT DOCUMENTS

CN   116894577 A   10/2023

OTHER PUBLICATIONS

Hacks et al.; Brand: PowerLang; Title: Title: "powerLang: a probabilistic attack simulation language for the power domain"; Dated: Nov. 25, 2020 Website Link: https://energyinformatics.springeropen.com/articles/10.1186/s42162-020-00134-4.

*Primary Examiner* — William A Corum, Jr.
(74) *Attorney, Agent, or Firm* — Jeremy Briggs (57) ABSTRACT

A system to handle cybersecurity threats is disclosed. The system may include a transceiver and a processor. The transceiver may be configured to receive a request from a user via a user interface rendered on a user device. The request may include a query associated with cyber security. The processor may be configured to render the user interface on the user device, and obtain the query from the transceiver. The processor may parse the query into structured data, and identify a sequence of templated actions based on the structured data and a security framework. The processor may map each templated action into one or more action blocks to perform the templated action, based on a user environment. The processor may prepare a workflow to resolve the query based on the sequence of templated actions and the action blocks for each templated action, and perform a predetermined action.

16 Claims, 5 Drawing Sheets

(56) References Cited

U.S. PATENT DOCUMENTS

| | | | | |
|---|---|---|---|---|
| 2022/0385687 A1* | 12/2022 | McKinley | ........... | H04L 63/1441 |
| 2023/0164175 A1* | 5/2023 | Thomas | .................. | H04L 9/002 |
| | | | | 726/23 |
| 2024/0259430 A1* | 8/2024 | P J | ...................... | G06F 16/2455 |

* cited by examiner

SYSTEMS AND METHODS FOR HANDLING SECURITY THREATS

FIELD

The present disclosure relates to cyber security, and more particularly to systems and methods for handling security threats.

BACKGROUND

In the cybersecurity industry, security analysts typically work on identifying and fixing problems or threats in computing systems. For example, a security analyst may analyze risks, vulnerabilities, threats, and incidents related to the networked computing systems and/or cybersecurity systems in general. The security analysts are generally burdened with manually managing complex workflows for threat intelligence, incident response, and other tasks. In order to ease their work load, organizations use various security tools and automation systems. Existing automation solutions are often limited and require technical expertise to implement, making them inaccessible to many security analysts.

Therefore, there exists a need for a more intuitive, flexible, and user-friendly automation system for security analysts.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure describes a system and method to handle cyber security threats. The system may be based on domain specific language (DSL). Specifically, the system may include a hierarchical DSL system having a plurality of DSL layers. For example, the system may include a first DSL layer (having a first set of instructions) and a second DSL layer (having a second set of instructions) to handle the cyber security threats. The first DSL may perform a first operation and generate a first output, the second DSL may receive the first output, perform a second operation, and generate a second output (e.g., via a processor associated with the system). Stated another way, the second output may be based on the first output.

In some aspects, the first DSL may obtain a query from a user (e.g., via a user interface rendered on a user device associated with the user). The query may be in natural language. Responsive to obtaining the query, the first DSL may parse the query into structured data, and may identify a list/sequence of templated actions based on the structured data. In some aspects, the first DSL (and/or the second DSL) may be based on a security framework, and may perform the first operation (and/or the second operation) based on the security framework. The security framework may include, for example, an ATT&CK (Adversarial Tactics, Techniques, and Common Knowledge) framework. The security framework may include any other conventional framework, and is not limiting to the ATT&CK framework.

In further aspects, the second DSL may obtain the list of templated actions from the first DSL. Responsive to obtaining the list from the first DSL, the second DSL may map each action with an action block/Application Programming Interface (API) (e.g., to implement each templated action with primitive API/action blocks). In some aspects, the second DSL (and/or the first DSL) may consider a user environment to perform the above-mentioned operations. In further aspects, the second DSL may be selected by the first DSL and may carry out a more domain specific task after being selected by the first DSL.

In further aspects, the system (or the processor associated with the system) may obtain the first output and the second output from the first DSL and the second DSL, respectively. Responsive to obtaining the first output and the second output, the system may prepare a workflow based on the first output and the second output. The workflow may include sequential steps or sequence of steps that may be followed to resolve the query. Responsive to preparing the workflow, the system may perform a predetermined action. The predetermined action may include automatically executing the workflow or displaying the sequential steps on the user interface to enable the user to resolve the query.

In some aspects, the system may assist the user in resolving the query by displaying the sequential steps. The sequential steps may provide step-by-step instructions that may be followed by the user to handle the cyber security threat or resolve the query. In some aspects, one or more steps may include an executable code to execute the respective step. The user may click on the respective executable code to execute the step. The user may similarly execute the executable codes for other steps to resolve the query. The system may be further configured to display results/responses associated with each step once the executable code for the step may be executed. In further aspects, the system may be configured to obtain user feedback on one or more step(s) of the sequential steps, update the step(s) based on the user feedback, and display the updated step(s) on the user interface.

In some aspects, the workflow may be represented by a Directed Acyclic Graph (DAG) having a plurality of nodes and edges. The edges may be used to connect the plurality of nodes. In some aspects, the nodes may represent actions (e.g., the sequential steps) and the edges may represent dependencies between the actions. This may enable the execution of complex, multi-step workflows with both synchronous and asynchronous operations.

The present disclosure discloses a system and method that assists a user in efficiently resolving a query related to cybersecurity risks, vulnerabilities, threats, and incidents. The user may interact with the system using natural language commands, which may enable even the non-coders to conveniently fix issues related to cybersecurity. The system is intuitive, flexible, user-friendly, and powerful in handling cyber security actions. The system further allows to perform the operations based on the user environment and the security framework, which increases reliability of the system output and ensures that it covers a comprehensive range of cybersecurity concepts and procedures. The system further simplifies the process of automating complex workflows, reducing the manual effort required for cyber threat intelligence, report generation, threat hunting, and incident response. In addition, the system may be integrated with various security tools and platforms, providing a versatile solution for automation. Further, the system allows the user to dynamically update the sequential steps (e.g., amend and/or add step(s)) based on user preferences.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 1:
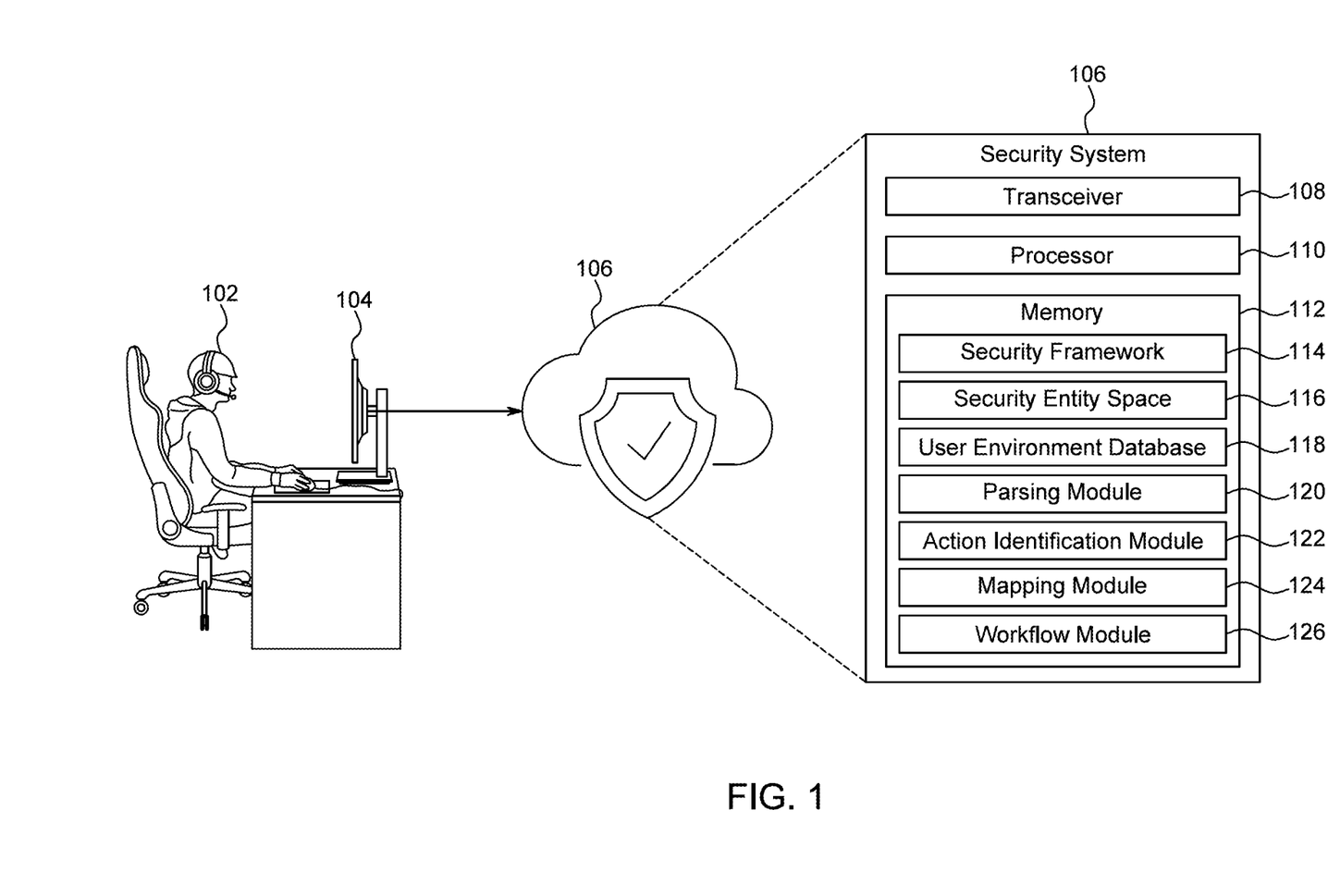
FIG. 1 depicts an example environment in which techniques and structures for providing the systems and methods disclosed herein may be implemented.

FIG. 1 depicts an example environment 100 in which techniques and structures for providing the systems and methods disclosed herein may be implemented. While explaining FIG. 1, references may be made to FIGS. 2 and 3.

The environment 100 may include a user 102, and a user device 104 associated with the user 102. The user 102 may be a security analyst who analyzes cybersecurity risks, vulnerabilities, threats, and incidents associated with an organization (such as company, institution, etc.). Specifically, the user 102 may analyze cybersecurity threats associated with one or more computing systems associated with the organization. In some aspects, the user 102 may analyze the cybersecurity threats (and perform remedial actions) by using the user device 104. The user device 104 may include, for example, a mobile phone, a laptop, a computer, a tablet, a wearable device, or any other device with communication capabilities.

The environment 100 may further include a security system 106 (or a security platform) that may be configured to assist the user 102 in handling cybersecurity threats associated with the organization, and may also be configured to automatically handle one or more such cybersecurity threats. For example, the security system 106 (or system 106) may assist the user 102 in analyzing the cybersecurity risks, vulnerabilities, threats, and incidents associated with the computing systems of the organization. In some aspects, the system 106 may be configured to assist the user 102 by interacting with the user 102 in natural language, thereby assisting the user 102 in comfortably and efficiently analyzing and handling the cybersecurity threats. For example, the system 106 may receive a query from the user 102 in natural language, and may provide a response to the query in natural language. This may facilitate the user 102 in handling the cybersecurity threats more easily and efficiently.

In some aspects, the system 106 may be communicatively coupled with the user device 104, and may assist the user 102 in handling the cybersecurity threats via the user device 104. The system 106 may be communicatively coupled with the user device 104 via a network (not shown). The network, as described herein, illustrates an example communication infrastructure in which the connected devices discussed in various embodiments of this disclosure may communicate. The network may be and/or include the Internet, a private network, public network or other configuration that operates using any one or more known communication protocols such as, for example, transmission control protocol/Internet protocol (TCP/IP), Bluetooth®, Bluetooth® Low Energy (BLE), Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples. In some aspects, the system 106 may be hosted on a server, which may be communicatively coupled with the user device 104. In other aspects, the system 106 may be installed or hosted on the user device 104.

The system 106 may include a plurality of units including, but not limited to, a transceiver 108, a processor 110 and a memory 112. The transceiver 108 may be configured to transmit/receive information/data to/from external systems and devices via the network (as an example). For example, the transceiver 108 may be configured to receive/transmit inputs/information/data from/to the user device 104. Similarly, the transceiver 108 may be configured to receive inputs/information from an external server (not shown).

Figure 2:
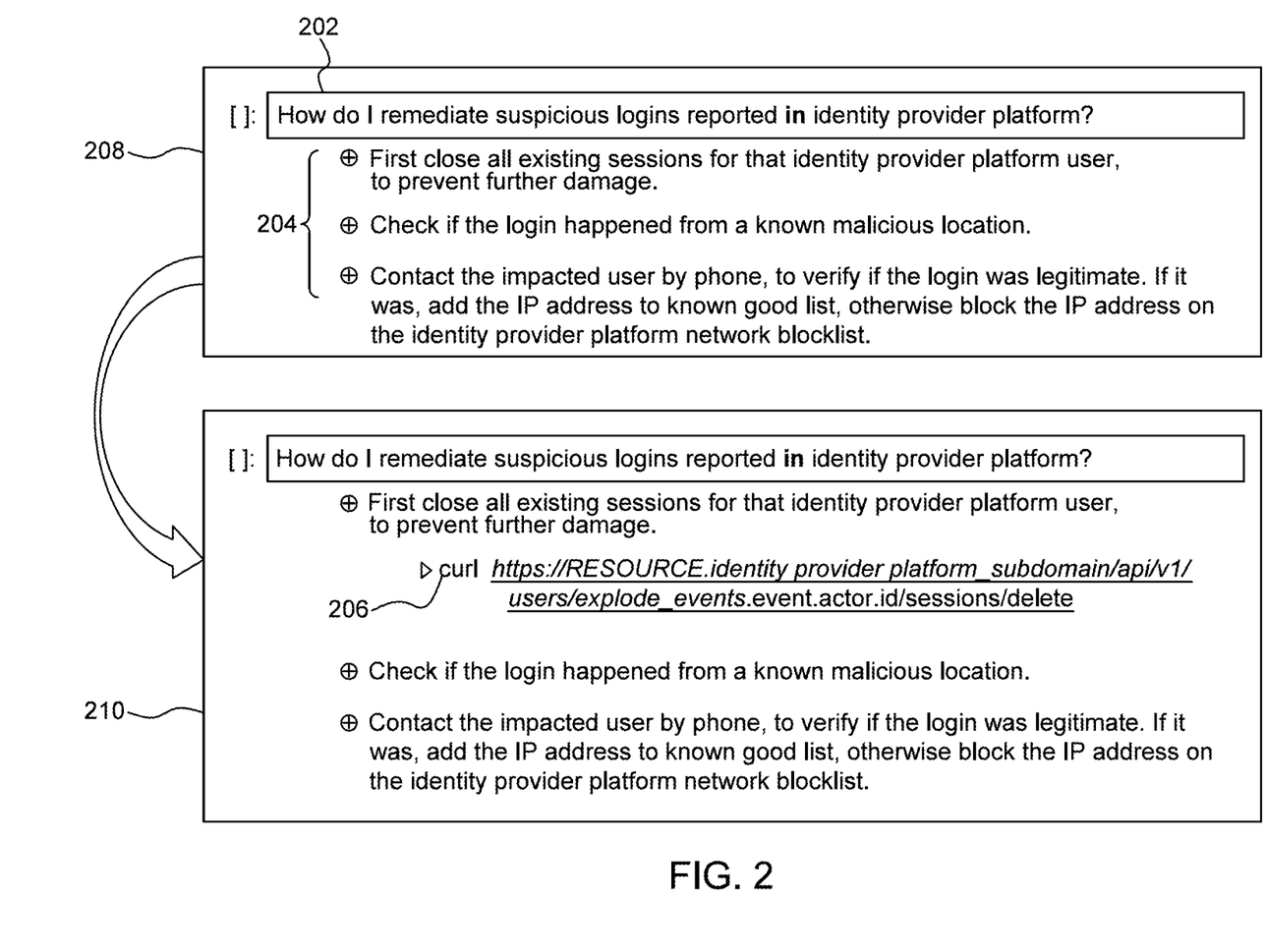
FIG. 2 depicts a first example snapshot of a user interface displaying a security system response in accordance with the present disclosure.
Figure 3:
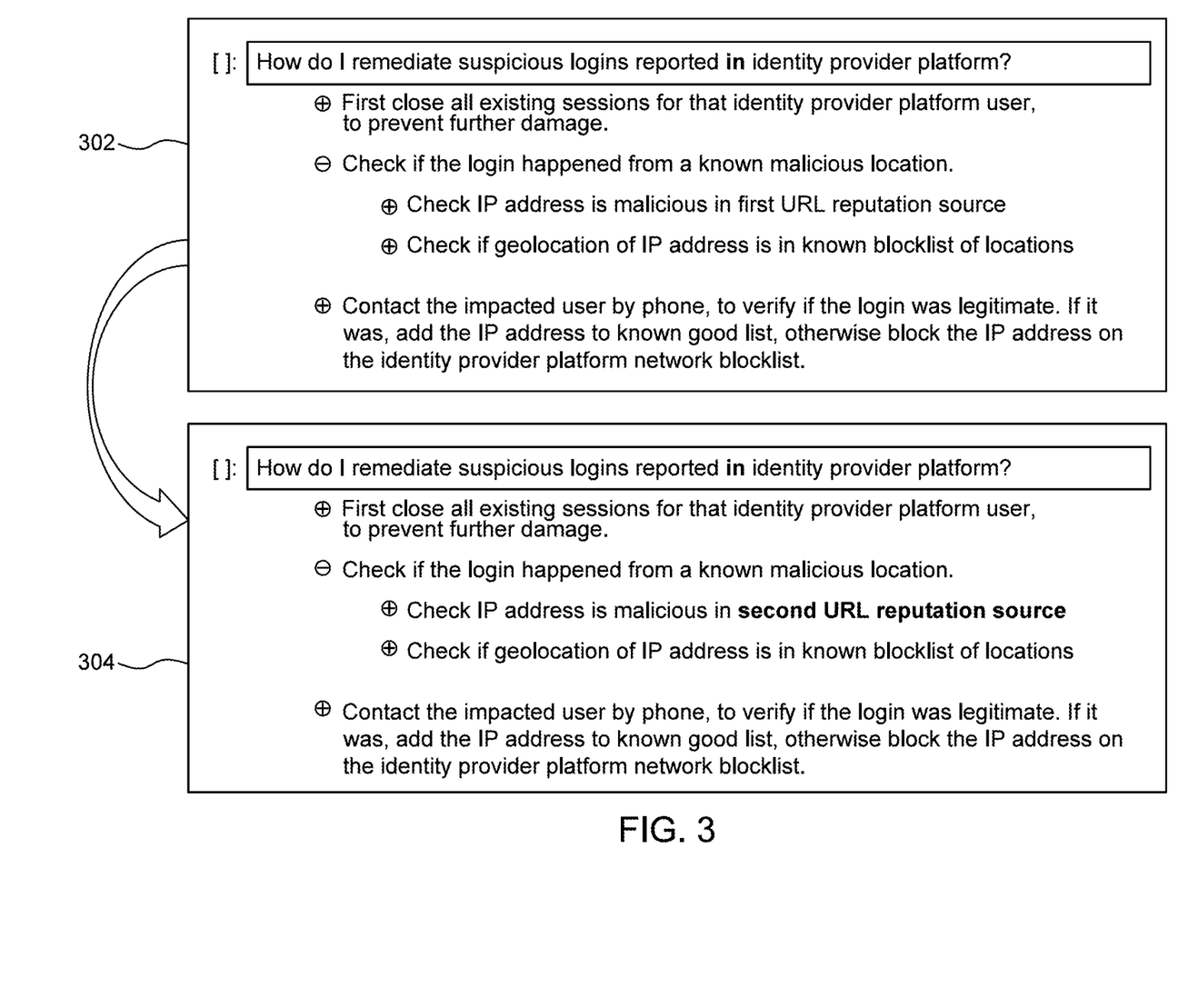
FIG. 3 depicts a second example snapshot of a user interface displaying a user feedback on a security system response in accordance with the present disclosure.

The processor 110 may be disposed in communication with one or more memory devices disposed in communication with the respective computing systems (e.g., the memory 112 and/or one or more external databases not shown in FIG. 2). The processor 110 may utilize the memory 112 to store programs in code and/or to store data for performing aspects in accordance with the disclosure. The memory 112 may be a non-transitory computer-readable storage medium or memory storing a program code that enables the processor 110 to perform operations in accordance with the present disclosure. The memory 112 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

In some aspects, the processor 110 may be based on a domain specific language (DSL). In further aspects, the DSL may be based on a security framework (e.g., a security framework 114, described below). In an exemplary aspect, the security framework may include ATT&CK (Adversarial Tactics, Techniques, and Common Knowledge) framework. The ATT&CK framework may be a knowledge base and model for cyber adversary behavior, reflecting the various phases of an adversary's attack lifecycle and the platforms they are known to target. Since the processor 110 is based on the security framework, the processor 110 may handle such cybersecurity threats accurately and effectively. The details of the DSL are described later in the description below. In some aspects, the processor 110 may use the security framework to develop threat models and methodologies to mitigate the threats. The security framework may include any other conventional framework, and is not limiting to the ATT&CK framework.

In some aspects, the security framework may include security entities that may serve as a grounding framework to handle the cybersecurity threats. Such entities may include, but are not limited to, tactics, techniques, sub-techniques, mitigations, groups, software, procedures, and/or the like. The tactics represent objectives or goals of an attacker, (e.g., "why" the attackers are performing an attack). Examples include initial access, execution, persistence, privilege escalation, defense evasion, credential access, discovery, lateral movement, collection, command and control, exfiltration, impact, etc. The techniques represent actions that an attacker performs to achieve their objectives, e.g., "how" the attackers may be performing an attack. Examples include spear-phishing attachment, drive-by compromise, exploitation for client execution, system network configuration discovery, remote file copy, data encrypted for impact, etc. The sub-techniques represent specific methods used by the attackers. The sub-techniques are more detailed breakdown of the techniques. Mitigations represent steps that may be taken to prevent or handle an attack. Examples include, but are not limited to, limit access to resource over the network, network intrusion prevention, user training, and/or the like. Groups may include sets of related intrusion activities that are tracked by a common name in the security community. Examples include APT28, APT29, Lazarus Group, etc. Software represents the specific tools or pieces of software used by the attackers. This includes various types of malware, but may also include security utilities and dual-use administrative tools that the attackers may use. Procedures represent descriptions of actions taken by a threat actor or software during a technique or sub-technique.

In some aspects, the memory 112 may include a plurality of databases and modules including, but not limited to, the security framework 114, a security entity space 116, a user environment database 118, a parsing module 120, an action identification module 122, a mapping module 124, a workflow module 126, and/or the like. The security framework 114 may be ATT&CK framework as described above. Further, the security framework 114 may include the security entities associated with the ATT&CK framework, as described above.

In some aspects, the security entity space 116 may include actions (e.g., templated actions) that may be performed on the security entities. In some aspects, for a given set of "tactics" (that represents objectives or goals of the attacker), the templated actions may be high-level strategic operations that may be performed to mitigate the attack. For example, an action may include "define", to set or formulate a new "tactic" (e.g., define 'initial access' as a tactic in the system 106). As another example, an action may include "update" to modify an existing "tactic" (e.g., update the 'execution' tactic details in the knowledge base associated with the security framework). As yet another example, an action may include "monitor" to keep a track of tactic's use (e.g., monitor the usage of 'persistence' tactic in the network).

Similarly, for a given set of "techniques" or "sub-techniques", the actions may include, but are not limited to, "execute" to carry out a technique, "block" to prevent a technique, "detect" to discover the user of a technique. Further, the actions associated with "mitigations" may include, but are not limited to, "implement" to put a mitigation into place, (such as implement "multi-factor authentication" mitigation), "test" to check effectiveness of a mitigation strategy, "update" to modify a mitigation, and/or the like.

Further, the actions associated with "groups" may include, but are not limited to, "track" to follow the activities of a group (such as APT28 group), "alert" to be notified of a group's activities, "investigate" to study a group's activities, and/or the like. Further, the actions associated with "software" may include "detect" to discover use of a software, "block" to prevent the use of a software, "analyze" to understand the functionality of a software, and/or the like. Further, the actions associated with "procedures" may include "execute" to carry out a procedure, "monitor" to watch a procedure's execution, "alter" to change a procedure, and/or the like.

In some aspects, the user environment database 118 may store information associated with security tools associated with the user device 104/the computing systems of the organization, historical security issues/attacks faced by the user device 104 or by the computing system associated with the organization, historical cybersecurity actions taken by the user device 104 (and/or by the organization associated with the user 102), and/or the like. In some aspects, the transceiver 108/processor 110 may obtain information associated with the user environment from the user device 104 and/or the computing systems associated with the organization, and may store the information in the user environment database 118 for storage purposes.

The parsing module 120, the action identification module 122, the mapping module 124, and the workflow module 126 may include/store computer instructions and/or algorithms, which may be executed by the processor 110 to perform operations in accordance with the present disclosure. The functions of these modules are described later in the description below. In some aspects, the computer instructions and/or algorithms associated with the above-mentioned modules may be expressed as DSL, and may be executed by the processor 110.

In operation, the transceiver 108 may receive a request from the user 102 via the user device 104. The request may include a query 202 (shown in FIG. 2) associated with cyber security. For example, as shown in FIG. 2, the query 202 may state "How do I remediate suspicious logins reported in an identity provider platform?". As shown in FIG. 2, the query 202 may be in natural language. In other aspects, the query 202 may include or be in form of an image, a document, speech, and/or the like.

In some aspects, the processor 110 may be configured to render a user interface on the user device 104, and the user 102 may use the user interface to input the query 202. The transceiver 108 may be configured to receive the request/query 202 via the user interface rendered on the user device 104. Responsive to receiving the query 202, the transceiver 108 may transmit the query 202 to the processor 110. In addition, the transceiver 108 may store the query 202 in the memory 112 for storage purpose.

The processor 110 may obtain the query 202 from the transceiver 108 (or the memory 112). Responsive to obtaining the query 202, the processor 110 may execute the instructions stored in the parsing module 120 to parse the query 202 into structured data. In some aspects, the parsing module 120 may parse the query 202 based on the security framework. In further aspects, the parsing module 120 may determine/identify one or more entities from the query 202. The entities may be, for example, "emails", "databases", "malicious threats" and so on, which will may be determined by the parsing module 120 from an in-depth analysis of the common entities, such as threats and data sources in the security landscape.

Responsive to parsing the query 202 into the structured data, the processor 110 may execute the instructions stored in the action identification module 122 to identify a sequence of templated actions (or actionable intents) based on the structured data, the security framework, and the security entity space 116. For example, the action identification module 122 may identify an action to "implement 'multi-factor authentication' mitigation to prevent 'Brute Force' attacks", based on the structured data, the security framework, and the security entity space 116. As another example, when the user 102 raises/inputs the query 202, the action identification module 122 may identify an action to "first close all existing sessions for that identity provider platform user, to prevent further damage," as shown in FIG. 2.

Responsive to identifying the sequence of templated actions, the processor 110 may execute the instructions stored in the mapping module 124 to map each templated action into one or more action blocks that may implement/perform the templated action. In some aspects, the action block may be an Application Programming Interface (API) that may be called to implement/perform the templated action. Stated another way, the mapping module 124 may identify a relevant API to perform the templated action, and map the API to the templated action. In some aspects, the mapping module 124 may identify the action block/API based on the user environment stored in the user environment database 118. Thus, the mapping module 124 may perform the mapping described above based on the user environment.

Further, the processor 110 may execute the instructions stored in the workflow module 126 to prepare a workflow to resolve the query 202 based the sequence of templated actions and the action block(s) for each templated action. In some aspects, the workflow may include one or more sequential steps 204 (or a sequence of steps, as shown in FIG. 2) to resolve the query 202. In some aspects, the sequential steps 204 may be executed in sequence (step by step) to resolve the query 202. The sequential steps 204 may be displayed in natural language to the user 102 (via the user interface rendered on the user device 104) so that it may be easy for the user 102 to understand and execute the steps 204. As an example, the sequential steps 204 may include a first step of closing all existing sessions for that identity provider platform user, to prevent further damage, a second step of checking if all login happened from a known malicious location, and so on, as shown in FIG. 2. As another example, to check for phishing emails, the sequence of steps 204 may include steps of enrichment (or gathering of the email) and triaging (or validating the phishing email), which may include sub-steps of URL checking, attachment checking, normal checking, and post-triage steps such as imploding results, formatting table, etc.

In further aspects, the workflow module 126 may perform a predetermined action responsive to preparing the workflow. The predetermined action may include at least one of displaying the workflow on the user interface of the user device 104 (e.g., to provide response to the query 202) or executing the workflow to resolve the query 202 automatically on the user device 204 (or on an external server). Stated another way, the workflow module 126 may either display the workflow (i.e., the sequence of steps 204) on the user device 104, or may automatically execute the workflow (i.e., the sequence of steps 204) to resolve the query 202. In some aspects, when the workflow module 126 automatically executes the workflow, the workflow module 126 may display results of the execution on the user device 104. In some aspects, the workflow module 126 may automatically execute the workflow periodically or one-time at a predefined time.

In some aspects, the workflow module 126 may generate executable codes 206 (or curl commands) for each step (or one or more steps) of the sequential steps 204. The workflow module 126 may generate the executable codes 206 based on the user environment (including the security tools associated/used by the user 102 and/or the computing systems associated with the organization). The workflow module 126 may display the executable codes 206 on the user interface rendered on the user device 104, and the user 102 may run/execute the executable codes 206 sequentially to resolve the query 202. When the user runs the executable codes 206, the workflow module 126 may display the result of the respective steps on the user device 104.

In some aspects, the workflow module 126 may display the sequential steps 204 in a condensed form as shown in a view 208 of FIG. 2 (e.g., without displaying the executable codes 206). When the user 102 clicks on a tab associated with a step, the workflow module 126 may expand the steps to display the executable code for that step, as shown in a view 210 of FIG. 2.

In some aspects, the workflow module 126 may receive an input (e.g., a first input) from the user 102 on a step, responsive to displaying the sequential steps 204 on the user device 104, and may execute the executable code associated with the step based on the first input. For example, the user 102 may provide the first input by clicking on the executable code 206. When the user clicks on the executable code 206, the workflow module 126 may execute the executable code 206. Responsive to executing the executable code 206, the workflow module 126 may determine a result associated with the step, and may display the result on the user device 104. In other aspects, the user 102 may copy the executable code 206, and may execute it outside the security system 106.

In further aspects, the workflow module 126 may be configured to receive user feedback from the user 102 on a step of the sequential steps 204, responsive to displaying the sequential steps 204 on the user device 104. The user feedback may include a second input to amend a step of the sequential steps 204. Specifically, the second input may be associated with amendments to the step. For example, the workflow module 126 may display a step of "check IP address is malicious in first URL reputation source", as shown in a view 302 of FIG. 3. Responsive to viewing this step, the user 102 may provide a feedback to change "first URL reputation source" to "second URL reputation source". Responsive to obtaining the feedback, the workflow module 126 may update the step (and/or an executable code associated with the step), as shown in a view 304 of FIG. 3.

The processor 110 may be further configured to record/store user activity in the memory 112. For example, the processor 110 may store the query 202, the user feedback (e.g., the second input), updated steps (generated based on the user feedback), and the workflow in the memory 112. The stored information may form a part of the user environment that may be used by the processor 110 in the future. In further aspects, the processor 110 may be configured to generate reports by using the information stored in the memory 112. For example, the processor 110 may generate daily user reports based on the user activity on the security system 106. In further aspects, the security system 106 may allow the user 102 to interact with other users (e.g., other users in the organization), via the security system 106.

In further aspects, the security system 106 may allow different users to collaborate to form a team to handle the cyber security threats. In addition, the security system 106 may allow each user to provide inputs which may viewed by other users in the team. Each user may also add a note for self-reference or for other users. The users may also share files/documents via the security system 106. It should be noted that the features described above are exemplary, and should not be construed as limiting the scope of the present disclosure.

Figure 4:
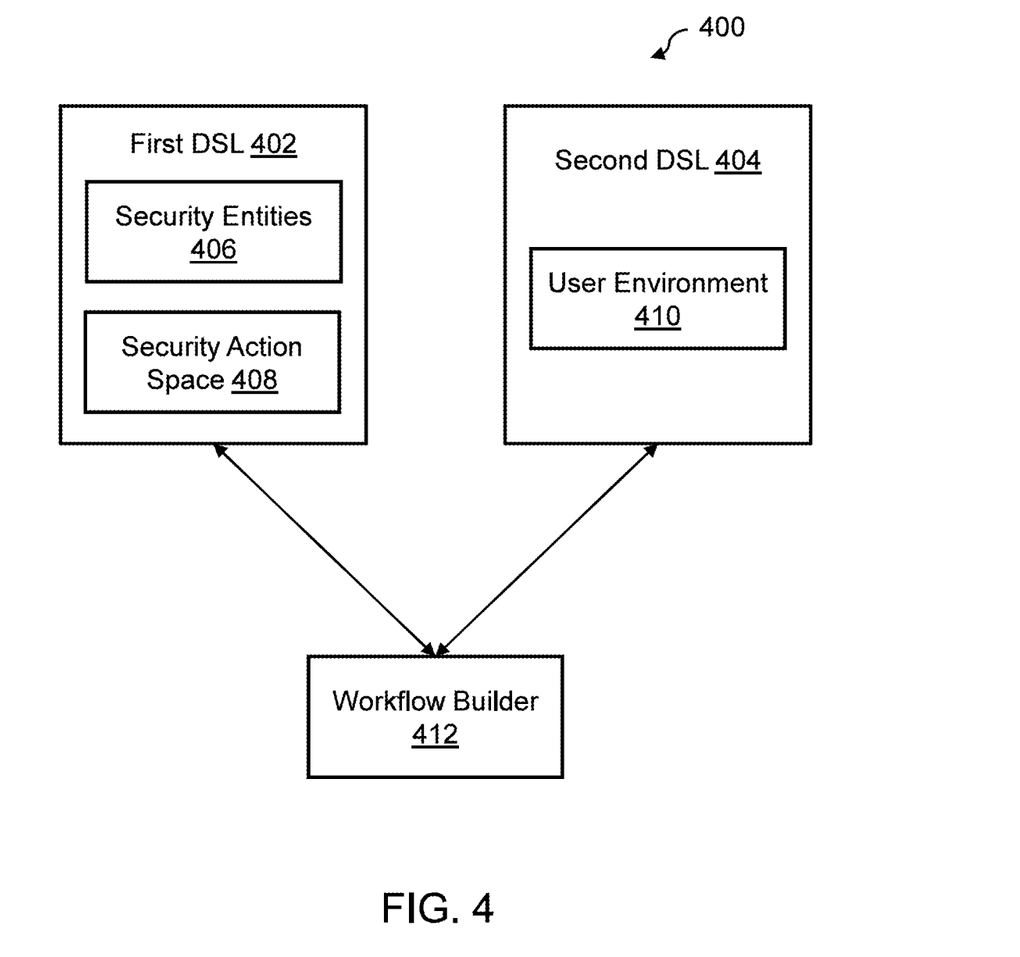
FIG. 4 depicts an example hierarchical domain specific language (DSL) system in accordance with the present disclosure.

FIG. 4 depicts an example hierarchical domain specific language (DSL) system 400 in accordance with the present disclosure. The DSL system 400 may include a plurality of DSL layers/systems, for example, a first DSL system 402 (or first DSL 402) and a second DSL system 404 (or second DSL 404). In some aspects, an output associated with the first DSL 402 may be an input to the second DSL 404. The first DSL 402 may include a first set of instructions, and the second DSL 404 may include a second set of instructions. The first and second set of instructions may be expressed as a first DSL and a second DSL respectively, and may be stored in the memory 112. In some aspects, the first set of instructions may be stored in a first memory space and the second set of instructions may be stored in a second memory space.

The first set of instructions may perform a first operation and the second set of instructions may perform a second operation. In some aspects, the first set of instructions may include instructions stored in the parsing module 120 and the action identification module 122 (as described above), and the second set of instructions may include instructions stored in the mapping module 124 (as described above). The processor 110 may execute the first set of instructions and second set of instructions to perform respective operations. For example, the processor 110 may to parse the query 202 and identify the sequence of templated actions using the first set of instructions. Similarly, the processor 110 may map each templated action into one or more action blocks by using the second set of instructions, based on the sequence of templated actions identified using the first set of instructions.

In some aspects, the first DSL 402 may be based on the security framework (having the security entities 406, as described above) and may include the security entity space 408. As described above, the security entities 406 may be stored in the security framework 114, and the security entity space 408 may be same as the security entity space 116. The first DSL 402 may use the security entities 406 and the security entity space 408 to parse the query 202 into the structured data (e.g., via the parsing module 120), and identify the sequence of templated actions based on the structured data (e.g., via the action identification module 122).

In further aspects, the second DSL 404 may perform actions based on a user environment 410. The user environment 410 may be stored in the user environment database 118. In some aspects, the second DSL 404 may receive the sequence of templated actions from the first DSL 402, and may map each templated action into one or more action blocks (e.g., API) that may implement/perform the templated action, based on the user environment 410 (e.g., via the mapping module 124). In some aspects, the first DSL 402 may be configured to capture user's intent and the second DSL 404 may be configured to map the user's intent to specific tools used in the organization. In further aspects, the second DSL 404 may be selected by the first DSL 402 and may carry out a more domain specific task after being selected by the first DSL 402.

In further aspects, a workflow builder 412 may use the output associated with the first DSL 402 and the second DSL 404 to build the workflow, as described above (e.g., via the workflow module 126). In some aspects, the workflow builder 412 may be another layer of DSL that may be used to prepare the workflow. In this case, the workflow builder 412 may include a third set of instructions that may be expressed in DSL, which may be executed by the processor 110 to build the workflow. In further aspects, the third set of instructions may include instructions stored in the workflow module 126 to perform the desired operation. In some aspects, the workflow builder 412 may prepare the workflow based on the output associated with the first DSL 402 and the second DSL 404.

In some aspects, the workflow may be represented by a Directed Acyclic Graph (DAG) that may be a directed graph with no directed cycles. The DAG may include a plurality of nodes and edges. The edges may be used to connect the plurality of nodes. In some aspects, the nodes may represent actions (e.g., the sequential steps 204) and edges may represent dependencies between the actions. For example, the actions may include a first action "enrichment" (e.g., gathering an email), a second action "triage" (e.g., validating the phishing email) that includes sub-steps/actions to check URL, check attachment, etc., a third action "post-triage" such as imploding results, formatting table, etc. The first action, the second action, and the third action, which may be performed sequentially.

In some aspects, the workflow builder 412 may receive inputs from the first DSL 402 and the second DSL 404, and construct the DAG representing the workflow, with nodes for each action and edges for dependencies between actions. Responsive to constructing the workflow, the workflow builder 412 may execute the workflow (e.g., manage the execution of each action based on its dependencies). The execution may involve executing actions concurrently if they have no dependencies, waiting for the completion of one action before starting another, handling errors and retries, and so on. Responsive to executing the actions, the workflow builder 412 may return the results of the executed workflow to the user interface rendered on the user device 104.

Figure 5:
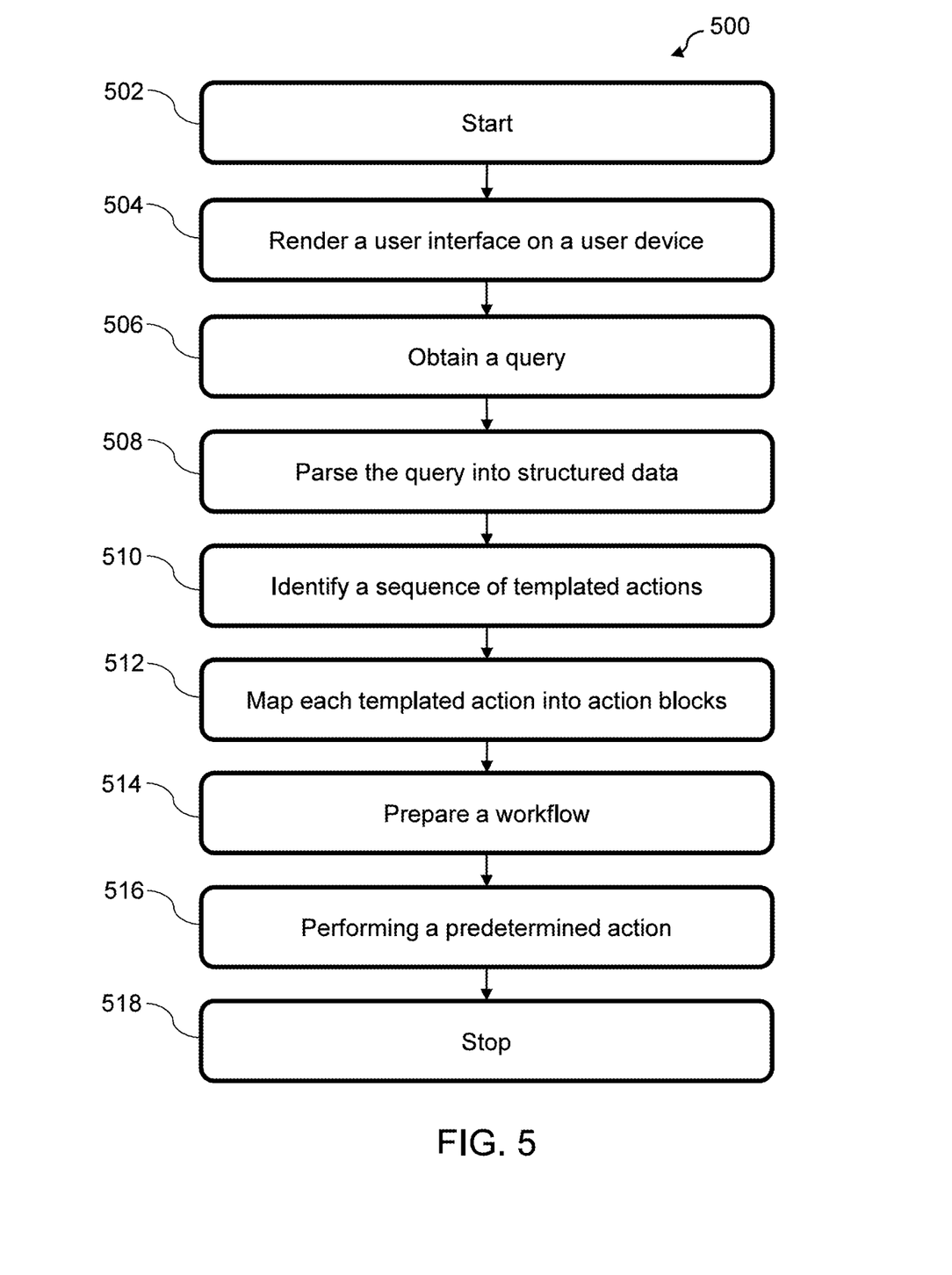
FIG. 5 depicts a flow diagram of an example method to handle security threats in accordance with the present disclosure.

FIG. 5 depicts a flow diagram of an example method 500 to handle security threats in accordance with the present disclosure. FIG. 5 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 500 starts at step 502. At step 504, the method 500 may include rendering, by the processor 110, a user interface of the user device 104 associated with the user 102 to receive a request. The request may include the query 202 associated with cyber security, as described above. At step 506, the method 500 may include obtaining, by the processor 110, the query 202 responsive to rendering the user interface.

At step 508, the method 500 may include parsing, by the processor 110, the query 202 into the structured data, responsive to obtaining the query 202. At step 510, the method 500 may include identifying, by the processor 110, a sequence of templated actions based on the structured data and the security framework.

At step 512, the method 500 may include mapping, by the processor 110, each templated action into one or more action blocks, responsive to identifying the sequence of templated actions. The action blocks may be configured to perform the templated action. The mapping may be performed based on the user environment. At step 514, the method 500 may include preparing, by the processor 110, a workflow to resolve the query 202, based on the sequence of templated actions and the action blocks for each templated action. At step 516, the method 500 may include performing, by the processor 110, a predetermined action responsive to preparing the workflow. The predetermined action may include at least one of displaying the workflow on the user interface or executing the workflow to resolve the query 202.

At step 518, the method 500 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A system comprising:
    a transceiver configured to receive a request from a user via a user interface rendered on a user device, wherein the request comprises a query associated with cyber security; and
    a processor communicatively coupled to the transceiver, wherein the processor is configured to:
        render the user interface on the user device;
        obtain the query from the transceiver;
        parse the query into structured data, responsive to obtaining the query;
        identify a sequence of templated actions based on the structured data and a security framework;
        map each templated action into one or more action blocks, responsive to identifying the sequence of templated actions, wherein the one or more action blocks are configured to perform the templated action, wherein the mapping is performed based on a user environment, and wherein the user environment comprises historical security issues faced by the user device and historical security actions taken by the user device;
        prepare a workflow to resolve the query, based on the sequence of templated actions and the one or more action blocks for each templated action, wherein the workflow comprises a sequence of steps;
        perform a predetermined action responsive to preparing the workflow, wherein the predetermined action comprises displaying the sequence of steps in natural language on the user interface to resolve the query, wherein displaying the sequence of steps comprises displaying executable codes for one or more steps of the sequence of steps;

obtain a first input from a user on an executable code, of the executable codes, responsive to displaying the executable codes; and execute the executable code based on the first input to perform a step associated with the executable code.

2. The system of claim 1, wherein the processor is further configured to:

determine a result associated with the step responsive to executing the executable code; and display the result on the user device.

3. The system of claim 1, wherein the processor is further configured to:

obtain a second input from the user on a step of the sequence of steps, responsive to displaying the sequence of steps, wherein the second input is associated with amendments to the step; and update the step and an executable code associated with the step based on the second input.

4. The system of claim 3, wherein the processor is further configured to store the query, the second input, and the updated step in a memory.

5. The system of claim 1, wherein the transceiver receives the query in natural language.

6. The system of claim 1, wherein the user environment further comprises security tools associated with the user device.

7. The system of claim 1 further comprising a memory storing a first set of instructions and a second set of instructions, wherein the first set of instructions are expressed as a first domain specific language (DSL) and the second set of instructions are expressed as a second DSL, and wherein the first DSL is different from the second DSL.

8. The system of claim 7, wherein an output associated with the first DSL is an input of the second DSL.

9. The system of claim 7, wherein the processor is configured to parse the query and identify the sequence of templated actions by using the first DSL.

10. The system of claim 7, wherein the processor is configured to map each templated action into the one or more action blocks by using the second DSL, based on the sequence of templated actions identified by using the first DSL, wherein the second DSL is configured to perform the mapping based on the user environment.

11. The system of claim 7, wherein the processor is configured to prepare the workflow by using outputs associated with the first DSL and the second DSL.

12. The system of claim 11, wherein the workflow is represented by a Directed Acyclic Graph (DAG) having nodes and edges, and wherein the nodes represent an action and edges represent dependencies between the actions.

13. The system of claim 4, wherein the processor is further configured to generate reports using information stored in the memory.

14. A method comprising:

rendering, by a processor, a user interface of a user device associated with a user to receive a request, wherein the request comprises a query associated with cyber security;

obtaining, by the processor, the query responsive to the rendering;

parsing, by the processor, the query into structured data, responsive to obtaining the query;

identifying, by the processor, a sequence of templated actions based on the structured data and a security framework;

mapping, by the processor, each templated action into one or more action blocks, responsive to identifying the sequence of templated actions, wherein the one or more action blocks are configured to perform the templated action, wherein the mapping is performed based on a user environment, and wherein the user environment comprises historical security issues faced by the user device and historical security actions taken by the user device;

preparing, by the processor, a workflow to resolve the query, based on the sequence of templated actions and the one or more action blocks for each templated action, wherein the workflow comprises a sequence of steps;

performing, by the processor, a predetermined action responsive to preparing the workflow, wherein the predetermined action comprises displaying the sequence of steps in natural language on the user interface to resolve the query, wherein displaying the sequence of steps comprises displaying executable codes for one or more steps of the sequence of steps;

obtaining, by the processor, a first input from a user on an executable code, of the executable codes, responsive to displaying the executable codes; and executing, by the processor, the executable code based on the first input to perform a step associated with the executable code.

15. A non-transitory computer-readable storage medium having instructions stored thereupon which, when executed by a processor, cause the processor to:

render a user interface on a user device associated with a user to receive a request, wherein the request comprises a query associated with cyber security;

obtain the query responsive to the rendering;

parse the query into structured data, responsive to obtaining the query;

identify a sequence of templated actions based on the structured data and a security framework;

map each templated action into one or more action blocks, responsive to identifying the sequence of templated actions, wherein the one or more action blocks are configured to perform the templated action, wherein the mapping is performed based on a user environment, and wherein the user environment comprises historical security issues faced by the user device and historical security actions taken by the user device;

prepare a workflow to resolve the query, based on the sequence of templated actions and the one or more action blocks for each templated action, wherein the workflow comprises a sequence of steps;

perform a predetermined action responsive to preparing the workflow, wherein the predetermined action comprises displaying the sequence of steps in natural language on the user interface to resolve the query, wherein displaying the sequence of steps comprises displaying executable codes for one or more steps of the sequence of steps;

obtain a first input from a user on an executable code, of the executable codes, responsive to displaying the executable codes; and execute the executable code based on the first input to perform a step associated with the executable code.

16. The system of claim 1, wherein the processor is further configured to generate the executable codes based on the user environment.

* * * * *